United States Patent [19]

Chapman

[11] 3,956,810

[45] May 18, 1976

[54] TOOL HOLDING AND POSITIONING DEVICE

[75] Inventor: John Edward Chapman, Whyteleafe, England

[73] Assignee: Babcock & Wilcox Limited, London, England

[22] Filed: Aug. 5, 1974

[21] Appl. No.: 494,992

[30] Foreign Application Priority Data

Aug. 6, 1973 United Kingdom............... 37254/73

[52] U.S. Cl............................. 29/200 P; 29/202 R; 137/316; 138/108; 73/432 R; 269/34; 214/1 CM

[51] Int. Cl.² ......................................... B23P 19/00

[58] Field of Search........... 29/200 P; 137/315, 316; 138/104, 108; 73/432 R; 104/138 G; 214/1 CM, 18 N; 269/34, 38.1

[56] References Cited
UNITED STATES PATENTS

| | | |
|---|---|---|
| 3,179,569 | 4/1965 | Fortescue et al............. 214/18 N X |
| 3,445,104 | 5/1969 | Douglas ........................... 269/48.1 |
| 3,713,550 | 1/1973 | Pugh............................ 214/18 N X |
| 3,718,978 | 3/1973 | Van Koevering et al... 104/138 G X |
| 3,794,340 | 2/1974 | Tartabini et al. ........... 104/138 G X |
| 3,861,987 | 1/1975 | Harbert ....................... 214/1 CM X |

*Primary Examiner*—C. W. Lanham
*Assistant Examiner*—V. Rising
*Attorney, Agent, or Firm*—J. M. Maguire

[57] ABSTRACT

The invention is directed to a device adapted to be inserted within a heat exchanger header of restricted transverse dimensions, for locating tools in operative relationship to each of the apertures in the heat exchanger's tube plate, said device having gripping means to fixedly mount the device within the heat exchanger, means rotatably mounting a portion of the device, a first carriage moveably mounted on said rotatable portion in a direction along the axis of the device, a second carriage mounted on said first carriage and transversely moveable thereto and means on said second carriage for mounting the tools on said second carriage.

8 Claims, 11 Drawing Figures

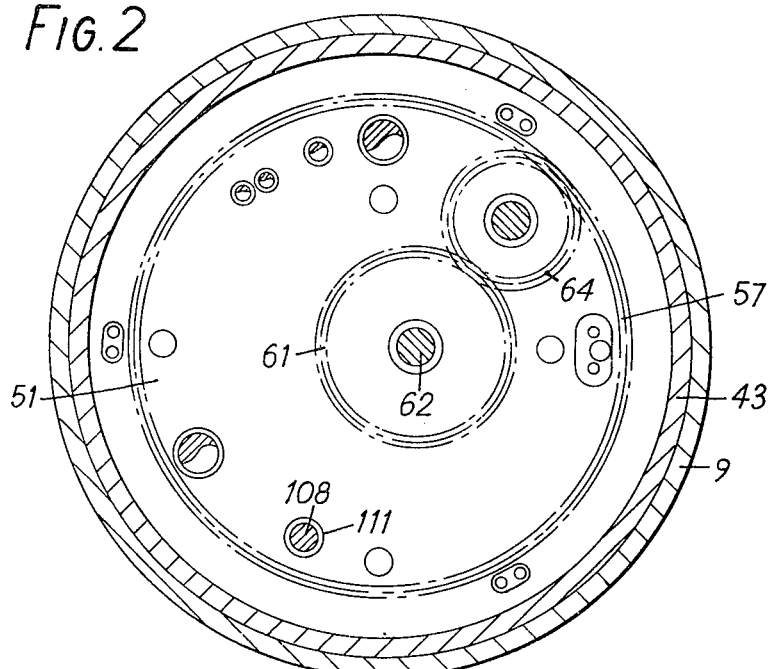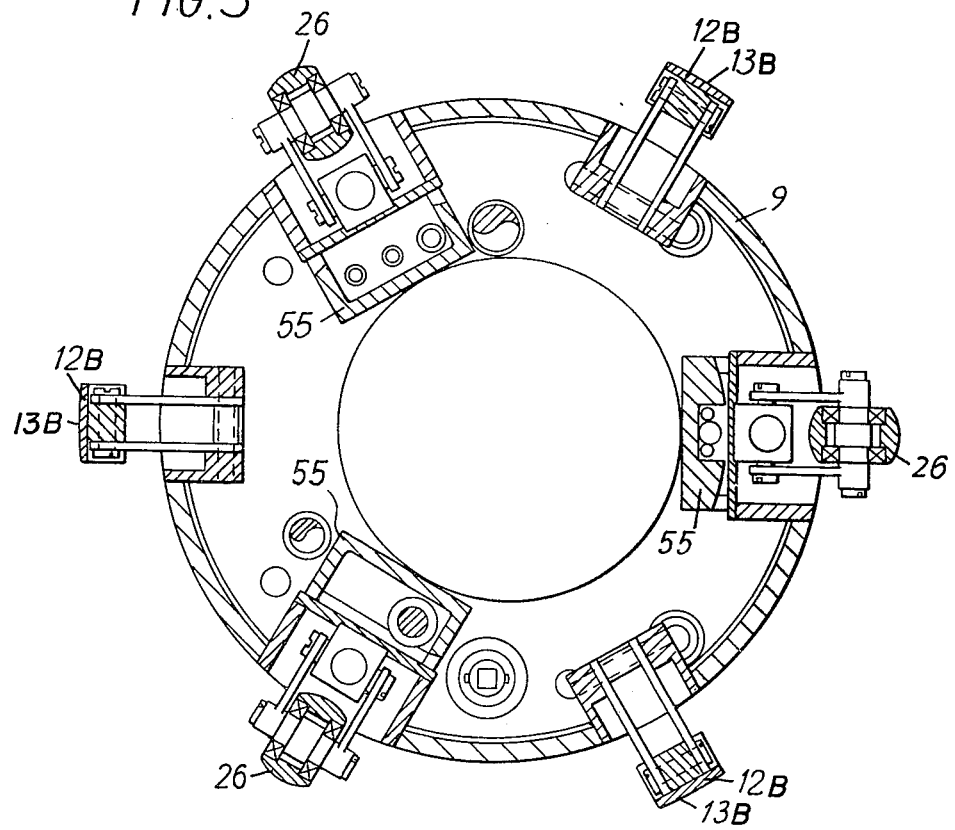

TOOL HOLDING AND POSITIONING DEVICE

This invention relates to appliance holders for locating tools, implements and instruments in operative relationship to workpieces accessible through passageways of restricted transverse dimensions.

According to the present invention, an appliance holder adapted for said purpose comprises: an elongate external frame having two longitudinally spaced sets of transversely outwardly expanding frictional gripping means; a ring of spur teeth; an inner elongate frame which is held within the external frame in two longitudinally spaced rotary bearings having a spur wheel engaging the ring of spur teeth, a motor arranged for rotating the spur wheel, and a portion of the inner elongate frame; a longitudinally movable carriage; a motor for moving said carriage; a further carriage mounted on the first-mentioned carriage transversely movable with respect to the first carriage and provided with a face plate for the attachment thereto of tools, instruments and implements and a motor mounted of the first-mentioned carriage for moving the second-mentioned carriage.

The invention will now be described by way of example with reference to the accompanying drawings of an appliance holder devised with a view to the effecting of various operations associated with explosively plugging the tube plate aperture associated with any tube which may be defective of a plurality of reheater tubes secured at their ends to a tube plate at an end of a header pipe of substantial length. In the drawings FIGS. 1A and 1B show a sectional side elevation of the appliance holder, which is shown as holding an explosive plug suspended from a claw grab, positioned within the reheater header pipe;

FIG. 2 is a plan view of the appliance holder in section on the line II—II of FIG. 1A;

FIG. 3 is a sectional plan view on the line III—III of FIG. 1B;

Figure 1A:
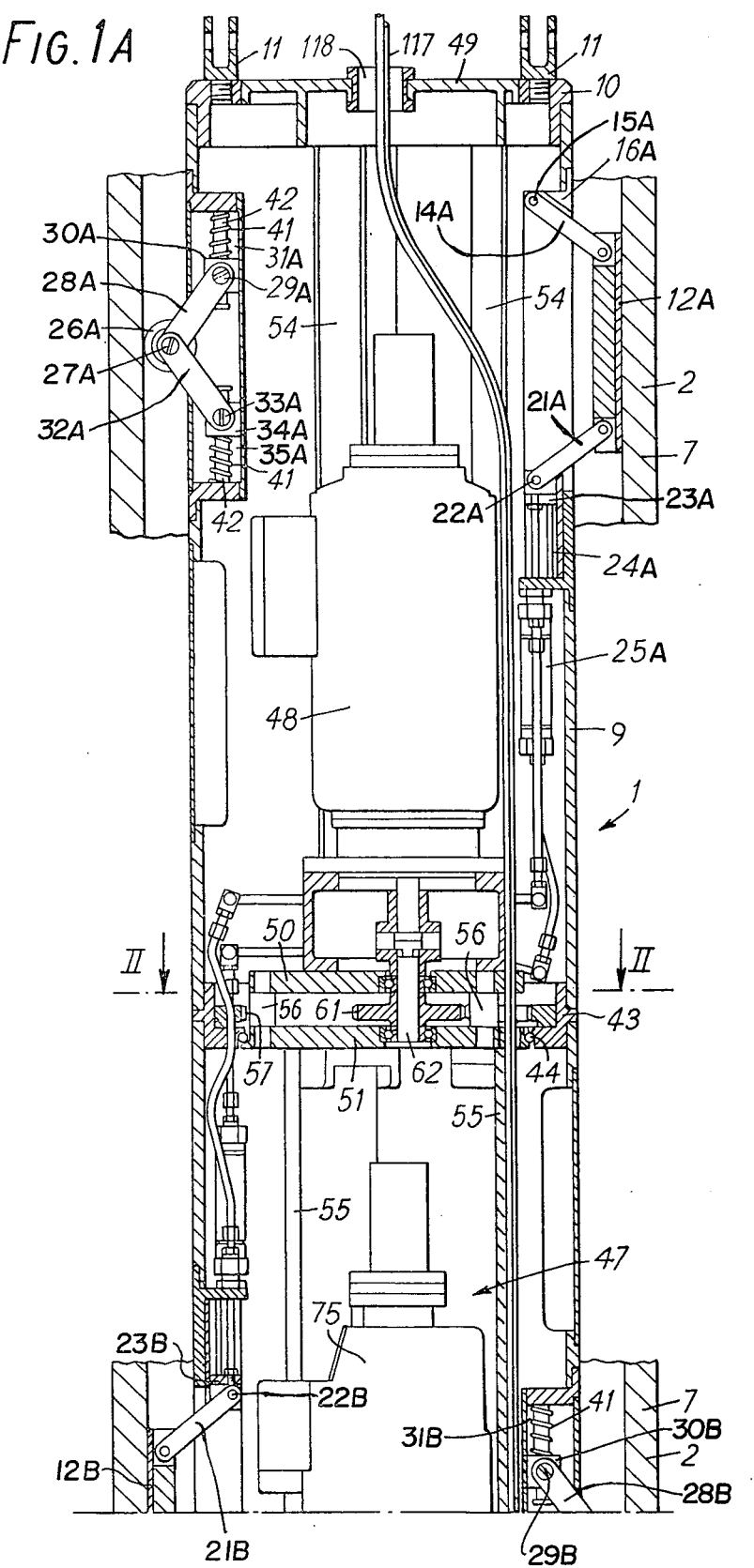

With reference to the drawings, an appliance holder 1 is positioned within a header pipe 2 which has been designed for a reheater heated by cooling gas of a gas cooled nuclear reactor power plant (not shown). In such reheater, the header pipes, of which there are a number, each serving to deliver steam to or receive steam from a plurality of reheater tubes, are arranged with their axes vertical and are of substantial length, extending from above to many feet below a thick concrete containment wall of the reheater. The header pipe comprises a horizontal tube plate 3, a short vertical cylindrical wall 6 joined to the periphery of the tube plate, a long second vertical cylindrical wall 7 of smaller diameter than the first cylindrical wall 6 and a frusto-conical wall 8 co-axial with and joining the two cylindrical walls 6 and 7. Secured to the tube plate 3 are reheater tubes 4, only one being shown, secured in respective apertures 5.

According to this invention, the appliance holder is adapted to be lowered into the header pipe and is shown herein as having been so lowered, after a cap to the header pipe has been removed. Furthermore, the appliance holder is shown secured within the header towards the lower end of the second cylindrical wall 7 and will be described as so positioned.

The appliance holder includes an external frame, which is a cylindrical casing 9 of vertical axis, secured at its upper end to the periphery of an upper ring 10 carrying lugs 11 for the attachment of cables (not-shown) by which the appliance holder is lowered or raised within the header pipe. The casing wall is interrupted at three locations equiangularly spaced around the casing adjacent its upper end, and also, at three locations equi-angularly spaced around the casing adjacent its lower end (see FIGS. 1A and 1B). Projecting laterally therefrom are frictional gripping shoes 12A and 12B which have gripping faces 13B, FIG. 3, adapted to the curvature of the internal face of the second cylindrical wall 7 of the header pipe.

Each shoe of the upper set 12A is attached at its upper end to the casing by a pair of spaced but side-by-side upper links 14A inclined downwardly and radially outwardly of the casing from a fixed pivot 15A on a bracket 16A within the casing and is attached at its lower end by a pair of spaced but side-by-side lower links 21A extending from the shoe downwardly and radially inwardly of the casing to a pivot 22A in a slide 23A movable in a vertical slideway 24A within the casing. The slide 23A is movable along the slideway 24A by a pneumatic piston and cylinder arrangement 25A, the operating fluid for which is applied at the same pressure to the cylinders for expanding outwardly from the casing all three shoes of the upper set 12A.

The shoes 12B of the lower set are similarly attached, except that for each of these shoes lower the pair of links 14B are attached to a fixed pivot 15B on a bracket 16B and the upper pair of links 21B are attached to a pivot 22B in a slide 23B. Furthermore, the operating fluid for the pneumatic piston and cylinder arrangements of the gripping shoes of the lower set is applied at the same pressure as for operating the gripping shoes of the upper set.

In addition, the casing wall is equiangularly interrupted at three locations adjacent both the upper and lower ends and between the equi angular gripping shoes there located. Furthermore, projecting laterally outwardly therefrom are upper rollers 26A and lower rollers 26B arranged for rolling in the vertical direction on the header pipe wall. Each roller axle 27A and 27B is attached by a pair of upper links 28A and 28B, one at each end of the axles, to a pivot 29A and 29B in an upper slide 30A and 30B movable along a vertical slideway 31A and 31B within the casing, and each axle 27A and 27B is also attached by a pair of lower links 32A and 32B, one at each end of the axle 27A and 27B, to a pivot 33A and 33B in a lower slide 34A and 34B movable along a similar vertical slideway 35A and 35B. The two slides 30 and 34 are biased towards one another, that is, in the direction which urges the roller 26 outwardly of the casing, by a compression spring 41 coiled around each of the fixed rods 42 extending through the slides.

Moreover, the gripping shoes 12B of the lower set are angularly displaced around the casing in relation to the gripping shoes 12A of the upper set so that each shoe 12B of the lower set is vertically below a roller 26A of the upper set of rollers.

About midway along its length, the casing is provided internally with an intermediate ring 43, part of which forms the fixed part of a ball bearing 44 concentric with the casing. Adjacent its lower end and below the lower end set of arrangements for the gripping shoes 12B lower set and the lower set of rollers 26B the casing is provided internally with a lower ring 45, part of which forms the fixed part of a further ball bearing 46 concentric with the casing. The two ball bearings 44 and 46 are arranged for axially locating the inner frame 47, within the casing, and for rotating the inner frame about a vertical axis of the casing. A motor 48 for turning the inner frame 47 is disposed within the casing.

The inner frame 47 comprises an upper horizontal circular plate 49 of which the periphery is adjacent the upper ring 10 of the external frame, a pair of intermediate horizontal circular plates 50 and 51, of which the plate 50 is spaced a short distance above the plate 51, a pair of lower horizontal circular plates 52 and 53, of which the plate 52 is spaced a short distance above the plate 53 at the lowermost end of the casing 9, and, for uniting the plates 49, 50, 51, 52 and 53 into a common structure, axially oriented structural members 54, 55, and 56 extending between adjacent plates. Moreover, the members 54, which extend between the plates 49 and 50, may be of T-section, the members 55 which extend between the plates 51 and 52 are of channel-section (FIG. 3), and the members 56, which extend between the plates 50 and 51 and between the plates 52 and 53, are in the nature of dowels.

The lower plate 51 of the intermediate pair is arranged to serve as the movable part of the ball bearing 44, and the upper plate 52 of the lower pair is arranged to serve as the movable part of the further ball bearing 46.

The intermediate ring 43 of the casing 9 mounts a ring of spur teeth 57 facing inwardly towards the space between the pair of intermediate plates 50 and 51 of the inner frame 47. In this space there is arranged a spur wheel 61 of which the shaft 62 is supported in bearings in the two plates 50 and 51 and projects above the upper plate 50 and which is arranged to be driven by the electric motor 48, which is mounted with vertical shaft on the upper plate 50. There is also arranged in the space between the plates 50 and 51 a further spur wheel 64 of which the axle 65 is supported in bearings in the two plates and which engages both the driven spur wheel 61 and the ring of spur teeth 57. The shaft of the motor 63 need not be, and as shown is not, co-axial with the inner frame 47.

Below the lower plate 53 of the pair of lower plates of the inner frame 47 there extends with vertical axes four columns 66 of which the upper ends are secured to the said lower plate 53 while their lower ends are secured in a common horizontal uniting plate 67. The columns 66 serve as vertical guides for a carriage 68, each column being embraced by two slide member parts 69 of the carriage, one above the other. Of the eight slide member parts 69 of the carriage 68, two of the lower parts are formed with respective extensions 70 which embrace respective vertical rotary shafts 71, of which the lower ends are journalled in the uniting plate 67 and the upper ends are journalled in the pair of lower plates 52 and 53 of the inner frame 47 and have secured thereto respective spur wheels 72 in the space between the two plates 52 and 53. These spur wheels 72 are engaged respectively by two further spur wheels 73 arranged in the space bottom plates 52 and 53 on axles fixed in the two plates 52 and 53 and, further, spur wheels 73 are both engaged by a spur wheel 74 driven by a second electric motor 75, which is mounted vertically with its shaft on the plate 52. The lower parts 81 of the rotary shafts 71 are screw-threaded and are engaged by the slide member extensions 70 in such a way that the rotary shafts 71 act as lead screws for movement of the carriage 68 in the vertical direction. The shaft of the second electric motor 75 need not be, and as shown is not, co-axial with the inner frame 47.

The carriage 68 is a box-like structure which includes two vertical parallel side walls 82 and is arranged for carrying between the side walls or partly extending beyond the space between the side walls a horizontally movable carriage 83 having at one end a vertical face plate 84 on which appliances useful in the various operations envisaged can be mounted. The horizontally movable carriage 83 is supported in the vertically movable carriage 68 through four horizontally extending linear roller slide arrangements 85A and 85B, one adjacent the top 85A and one adjacent the bottom 85B of each vertical side wall 82 of the vertically movable carriage 68. Each slide arrangement comprises two linear roller slides 86 separated by an intermediate member 87 which moves with the horizontally movable carriage but to half the distance. To the inner side of one of the vertical side walls 82 of the vertically movable carriage 68 there is arranged a horizontally extending lead screw 88 engaged by a lug 89 on the horizontally movable carriage. An arrangement 90 of pinions, bevel pinions and lay shafts makes possible the rotation of the lead screw 88 by a third electric motor 91, which is arranged with its drive shaft vertical and is carried by brackets 92 to the outerside of the wall 82 carrying the lead screw 88.

Figure 4:
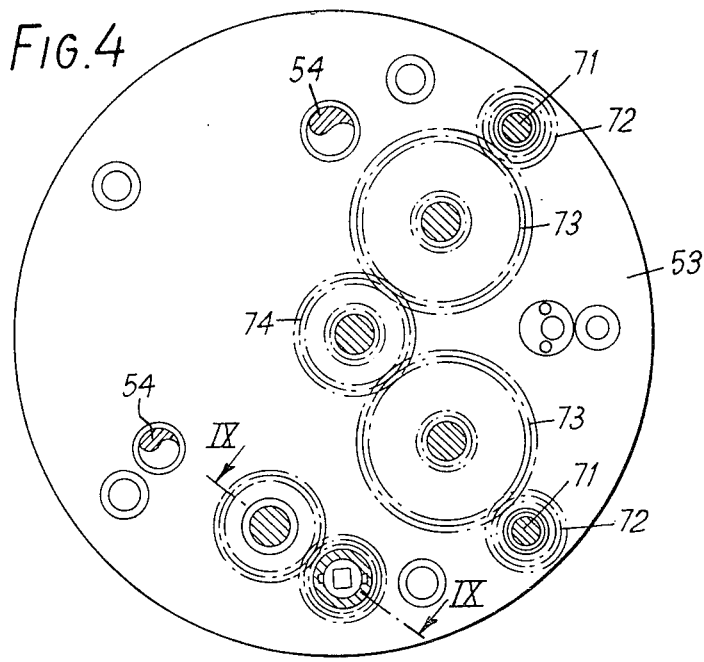
FIG. 4 is a sectional plan view on the line IV—IV of FIG. 1B.
Figure 6:
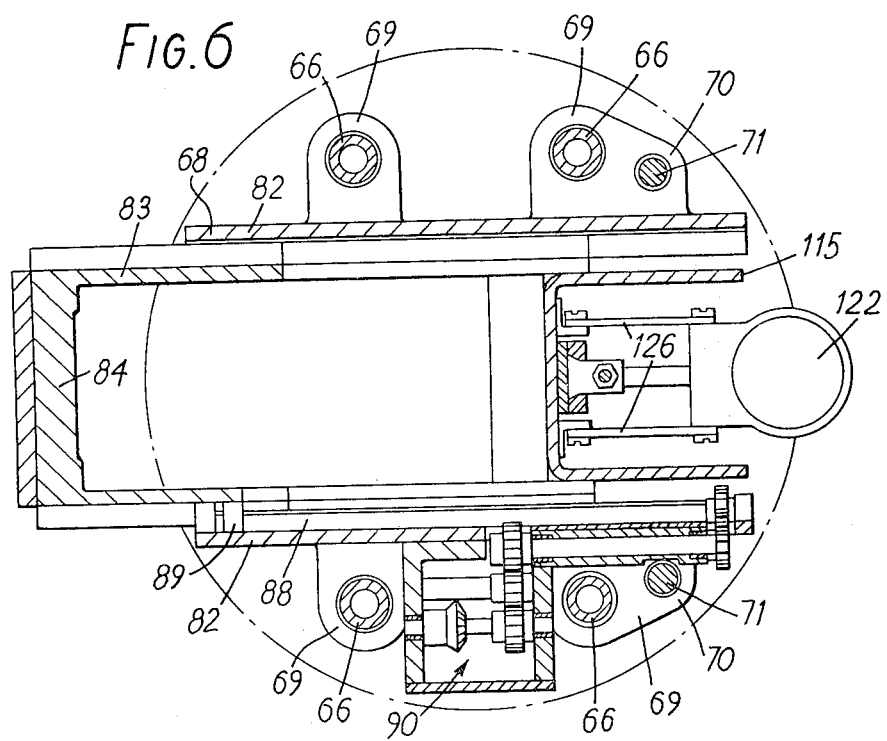
FIG. 6 is a sectional plan view on the line VI—VI of FIG. 5.
Figure 9:
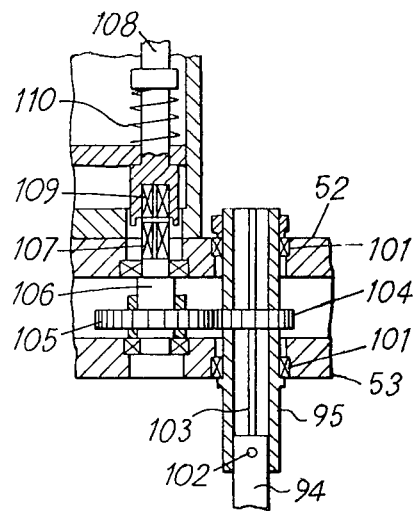
FIG. 9 is an elevation of part of the machine in section on the line IX—IX of FIG. 4.
Figure 10:
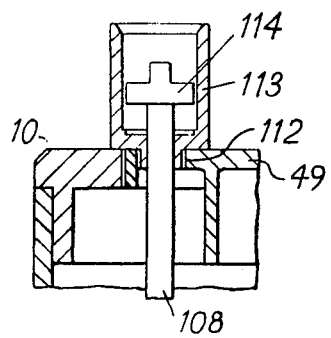
FIG. 10 is a sectional elevation of another part of the appliance holder.

At the upper end of the third electric motor 91 the drive shaft thereof is axially connected to the lower end of a vertical squared shaft 93, the upper end of which is co-axially secured in an intermediate shaft 94 of which the upper end can slide in a vertical sleeve 95. With reference to FIGS. 4 and 9, the vertical sleeve 95 extends through the pair of lower plates 52, 53 of the inner frame 47 and is secured against vertical movement with respect to the plates while rotary bearings 101 between the sleeve and the plates enable it to be rotated. The intermediate shaft 94 is provided with radially extending pins 102 projecting into vertical channels 103 in the inner face of the sleeve 95. The sleeve is formed with a spur wheel 104 in the space between the two plates 52, 53, which engages a spur wheel 105 on a stub shaft 106 rotatably secured in the two plates and having at its upper end a squared portion 107 projecting above the upper plate 52. It will be understood that if by the application of electric current the third drive motor 91 rotates to operate the lead screw 88 for moving the horizontally movable carriage 83 it also causes to rotate the vertical squared shaft 93, the intermediate shaft 94, the vertical sleeve 95 and the stub shaft 106. A vertical manual drive shaft 108 is provided for rotating the stub shaft 106, and also the third electric motor 91, by hand, if the motor should fail and if it should be necessary to withdraw the horizontally movable carriage 83 to a position in which the face plate 84 is nearer the rotary axis of the inner frame 47, in order to make possible an upward withdrawal of the whole apparatus. The manual drive shaft 108 has an internally squared socket 109 at its lower end which can engage the squared portion 107 of the stub shaft 106. The shaft 108 is upwardly biased by a compression spring 110 towards a position of non-engagement with the stub shaft 106, and extends upwardly within the channel of one of the members 55 and through a sleeve 111 (FIG. 2) in apertures in the pair of intermediate plates 50, 51. Further, the shaft extends through an aperture 112 (FIG. 10) in the upper plate 49 and terminates, within an open-topped housing 113 mounted on the plate 49, in a head 114 which provides one part of a dog clutch. The open-topped housing 113 serves as a socket within which to place the lower extremity, formed as the other part of the dog clutch, of a hand-manipulated tool (not shown) when it is required to rotate the manual drive shaft 108. The third electric motor 91 can be turned by using the tool to rotate the manual drive shaft 108 while maintaining it, against the force of the biasing compression spring 110, in a lowered position in which the squared socket 109 at its lower end engages the squared portion 107 of the stub shaft 106.

Extending vertically downwardly from the lower plate 53 of the pair of plates 52, 53 of the inner frame 47 is a bent-plate channel 115 U-form in horizontal crosssection, which is secured to the lower face of the plate 53 through a head plate 121 and is secured at its lower end to the uniting plate 67. The channel 115 extends past the vertically movable carriage 68 in a space between the vertical side walls 82 thereof that is on the other side of the rotary axis of the inner frame from the vertical face plate 84 of the horizontally movable carriage 83. On the channel 115, in the space defined by the channel, are attached supporting means for a television camera 122 of approximately upright axis, a mirror 123 oriented to enable the television camera to view the scene of employment of appliances that may be mounted on the face plate 84, a pair of shaded lamps 124, one on either side of the television camera axis, for illuminating the scene, and a pneumatic piston-and-cylinder arrangement 125. The television camera, the mirror and the lamps are mounted on a linkage 126 which is operated by the piston-and-cylinder arrangement and which is arranged so that a lowering or raising of the television camera, mirror and lamps moves them also respectively radially away from or radially towards the rotary axis of the inner frame 47. The necessary cables 117 for the camera and the lamps are taken upwardly through apertures in the plates 52 and 53, extend in the channel of another of the members 55, pass through apertures in the plates 50 and 51 and lead out of the inner frame 47 through an aperture 118 in the upper plate 49 thereof. Cables for the three motors and pipes for the pneumatic system also use the aperture 118.

Figure 5:
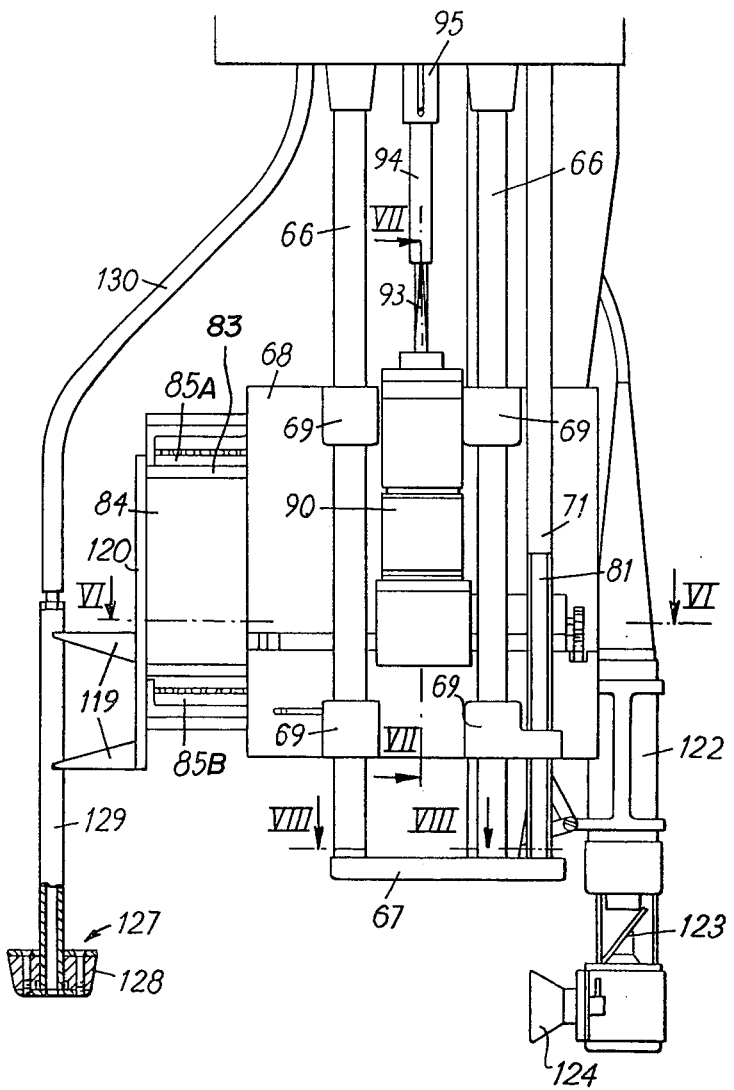
FIG. 5 is an external elevation of an end portion of the appliance holder, which is shown as holding a leak detection probe in place of an explosive plug suspended from a claw grab.
Figure 7:
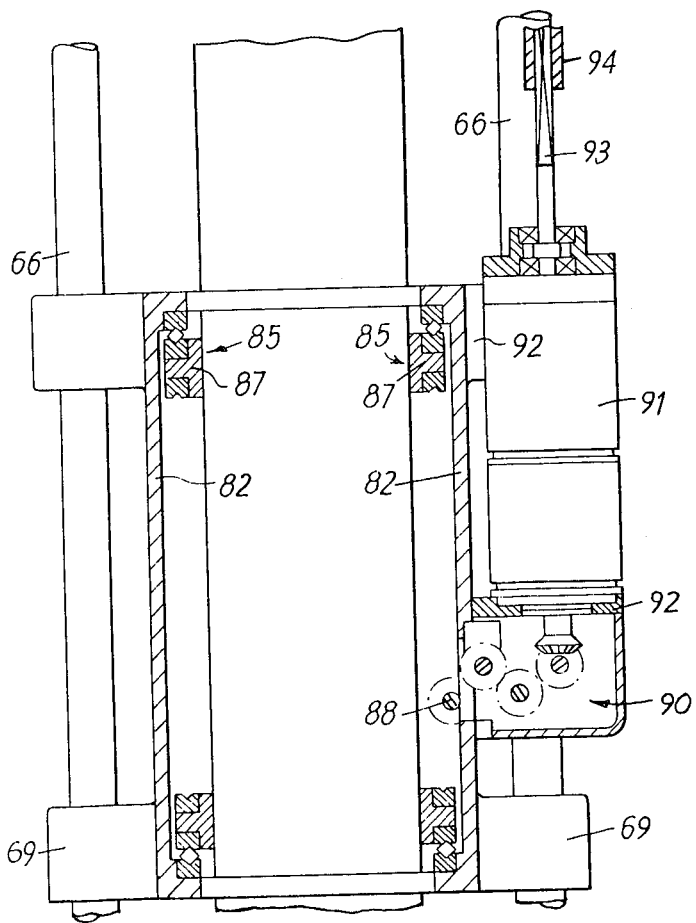
FIG. 7 is a sectional elevation on the line VII—VII of FIG. 5.
Figure 8:
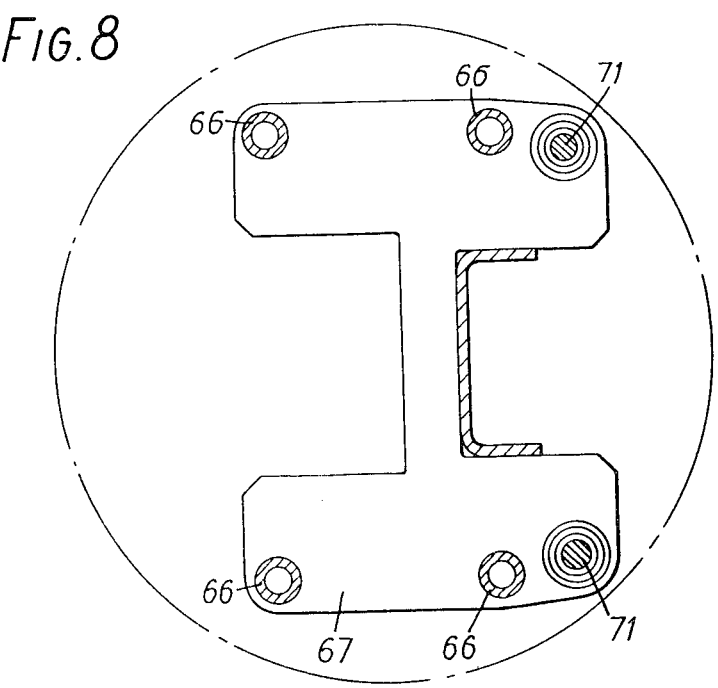
FIG. 8 is a sectional plan view on the line VIII—VIII of FIG. 5.

The face plate 84 of the horizontally movable carriage 83 is arranged for the mounting thereon of any of various appliances which will make possible the operations associated with explosive plugging. With reference to FIG. 5, one of such appliances may be a leak detection probe 127, comprising a tapered rubber plug 128, adapted to fit into the mouth of any of the apertures in the tube plate 3, attached at the lower end of a test gas tube 129 which can communicate with the interior of the reheater tube associated with the tube plate aperture which has been plugged by the probe 127 and which connects with a flexible tube 130 for conveying test gas from the reheater tube to an infrared analyzer (not shown). The appliance is premounted through brackets 119 on a plate 120 by which it is secured to the face plate 84.

In order to use the leak detection probe 127, it is mounted on the face plate 84 before the machine is lowered into the reheater header pipe. As the machine is so lowered, the machine is biased towards a central position in the cylindrical wall 7 of the header pipe by the springloaded rollers 26A and 26B and by the gripping shoes 12A and 12B which latter, by the application of a certain amount of pneumatic pressure to the piston-and-cylinder arrangements 25, are used as brakes. When the machine has been lowered a suitable distance to enable use of the leak detection probe, the gripping shoes 12A and 12B are caused by the application of a higher pneumatic pressure to firmly grip the cylindrical wall 7. The piston-and-cylinder arrangement 125 is then operated to lower the television camera, mirror and lamps and the rubber plug 128 is lowered into each tube plate aperture in turn while the test gas from each is checked. In order to align the axis of the rubber plate 128 with any particular tube plate aperture, the first electric motor 63 is operated as may be necessary to turn the inner frame 47, and the third electric motor 91 is operated as may be necessary to move the horizontally movable carriage 83 in the vertically movable carriage 68. Operation of the second electric motor 63 enables the plug 128 to be lowered into the mouth of the selected tube aperture.

After the identification, by systematic use of the leak detection probe, of a tube plate aperture which should be explosively plugged, it may be advantageous or necessary to prepare the inner surface of the tube plate aperture by using the machine to lower into the tube plate aperture a type of rotating brush (not shown) mounted on the face plate 84 in place of the leak detection probe. Still another appliance that may be mounted on the face plate, after removal of the previously used appliance, is an instrument (not shown) for measuring the internal diameter of the tube aperture, in order that an explosive plug of the correct external diameter before explosion may be selected; such instrument may be a rod-type air gauge. Another appliance (not shown) may be one for temporarily crowning or placing a plug in every tube plate aperture except that which is to be explosively plugged, in order to prevent the entry into those apertures of debris resulting from the explosion. Another appliance (not shown) may be one for placing on the tube sheet concentrically with the aperture to be explosively plugged a plastics guide ring 131 (see FIG. 1B) coated with adhesive so that it will adhere to the tube plate and adapted to serve as a locating means for the upper end of an explosive plug.

Figure 1B:
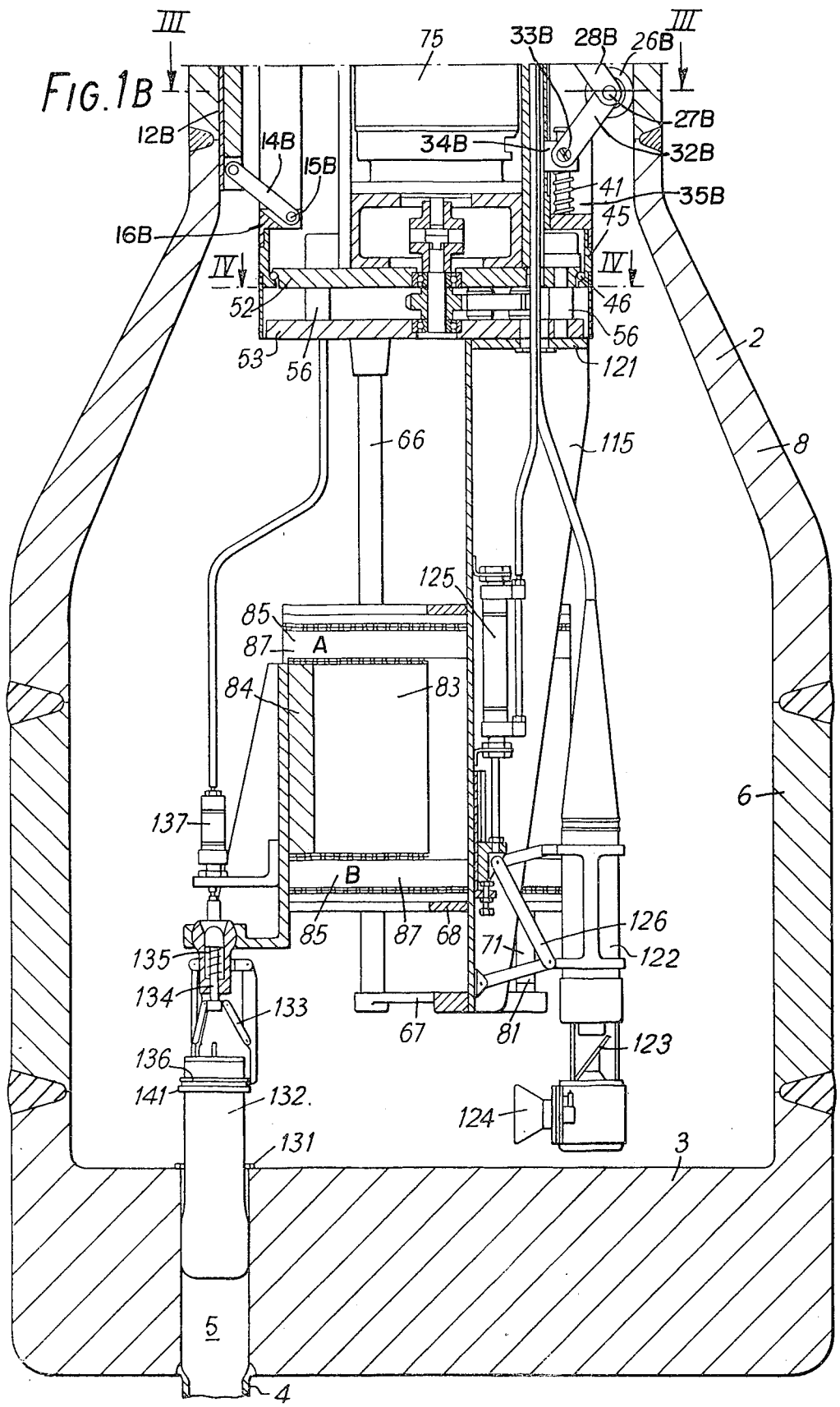

With reference to FIG. 1B, an appliance mounted or the face plate 84 by which an explosive plug 132 can be lowered into the tube aperture by operation of the second electric motor 63 comprises a three-armed claw grab 133, the arms of which are operated simultaneously by a plunger 134 biased by a compression spring 135 towards a position in which their claw ends engage the explosive plug below a flange 136 thereon and comprises also a pneumatic piston-and-cylinder device 137 for overcoming the bias of the spring 135. A flange 141 below the flange 136 on the explosive plug is adapted for the support of the plug from the upper surface of the tube plate when, after the lowering of the plug into the tube aperture, the device 137 is operated to open the claw grab. In accordance with the design of the explosive plug, its outer surface tapers somewhat in the upward direction but the guide ring 131, within which the flange 141 fits, ensures that the plug is coaxial with the tube plate aperture when it is in place ready for the firing of the explosive in its interior.

We claim:

1. A device for holding and positioning tools with respect to a tube sheet having wall means defining a restricted access to said tube sheet, said device comprising an elongate external frame, a plurality of radially projecting upper gripping shoes angularly spaced about the external frame and radially adjustable outwardly to frictionally anchor said device to the wall means, a plurality of radially projecting lower gripping shoes angularly spaced about the external frame and radially adjustable outwardly to frictionally anchor said device to the wall means, said lower shoes being disposed in spaced coaxial relation to said upper shoes, an elongate internal frame disposed within said external frame, and means for rotating the internal frame, said last named means including axially spaced bearings interposed between said internal and external frames, a first carriage mounted on the internal frame, and means for moving the first carriage longitudinally of said internal frame, a second carriage mounted on the first carriage, and means for moving the second carriage lineraly transverse of said first carriage, said second carriage including bracket means for holding said tools.

2. A device according to claim 1, wherein the upper and lower frictional gripping shoes include;
   pneumatic piston and cylinder expansion means.

3. A device according to claim 1, including;
   a plurality of upper and lower rollers angularly spaced about the external frame and moveable radially outwardly therefrom.

4. A device according to claim 1 wherein the internal frame includes a plurality of longitudinally spaced plates having their planes transverse to the longitudinal axis of the device, and a plurality of longitudinal members extending between adjacent plates uniting said plates into a common structure.

5. A device according to claim 1, wherein the means for rotating said internal frame further includes;
   a pair of first plates located substantially midway between the ends of the internal frame, one of the first plates being mounted on one of the bearings for rotation about the longitudinal axis of the frame;
   a motor;
   a spur wheel disposed between the plates and connected to the motor for rotating said moveable plate;
   a pair of second plates connected to one of the ends of the inner frame, one of said second plates being mounted on another one of the bearings for rotation about the longitudinal axis of the frame; and
   a plurality of longitudinal members interconnecting said first and second plates.

6. A device according to claim 1, wherein the moving means of the first carriage includes;
   a motor;
   a column slideably supporting said first carriage; and
   a threaded means connecting the first carriage to said motor.

7. A device according to claim 1, wherein the moving means for the second carriage includes;
   a motor;
   a drive shaft connected to the motor; and
   a lead screw connecting the second carriage to the drive shaft for translating rotary motion to linear motion.

8. A device according to claim 7, further including;
   a manual drive shaft extending longitudinally of the internal frame; and
   means for engaging the manual shaft to the drive shaft for driving said lead screw and said second carriage.

* * * * *